United States Patent [19]
Valko et al.

[11] Patent Number: 5,633,297
[45] Date of Patent: May 27, 1997

[54] CATIONIC RESIN CONTAINING CAPPED ISOCYANATE GROUPS SUITABLE FOR USE IN ELECTRODEPOSITION

[75] Inventors: Joseph T. Valko, Pittsburgh; Richard F. Karabin, Ruffs Dale, both of Pa.

[73] Assignee: PPG Industries, Inc., Pittsburgh, Pa.

[21] Appl. No.: 334,711

[22] Filed: Nov. 4, 1994

[51] Int. Cl.$^6$ .................................................. C08L 63/00
[52] U.S. Cl. ............... 204/500; 523/415; 523/404; 525/528; 528/45; 528/73; 427/386; 204/506
[58] Field of Search ................................ 523/415, 404; 427/386; 204/181.7

[56] References Cited

U.S. PATENT DOCUMENTS

| | | | |
|---|---|---|---|
| 3,793,278 | 2/1974 | De Bona | 260/29.2 EP |
| 3,922,253 | 11/1975 | Jerabek et al. | 260/77.5 TB |
| 3,928,156 | 12/1975 | Wismer et al. | 204/181 |
| 3,935,087 | 1/1976 | Jerabek et al. | 204/181 |
| 3,959,106 | 5/1976 | Bosso et al. | 204/181 |
| 3,984,299 | 10/1976 | Jerabek | 204/181 |
| 4,036,795 | 7/1977 | Tominaga | 260/18 PN |
| 4,104,147 | 8/1978 | Marchetti et al. | 204/181 C |
| 4,134,866 | 1/1979 | Tominaga et al. | 260/18 PN |
| 4,148,772 | 4/1979 | Marchetti et al. | 260/29.2 EP |
| 4,278,580 | 7/1981 | Scholzer et al. | 260/29.2 EP |
| 4,352,842 | 10/1982 | Kooymans et al. | 427/385.5 |
| 4,420,574 | 12/1983 | Moriarity et al. | 523/404 |
| 4,423,166 | 12/1983 | Moriarity et al. | 523/414 |
| 4,427,805 | 1/1984 | Kooijmans et al. | 523/417 |
| 4,432,850 | 2/1984 | Moriarity et al. | 204/181 C |
| 4,435,559 | 3/1984 | Valko | 528/45 |
| 4,468,307 | 8/1984 | Wismer et al. | 204/181 C |
| 4,536,558 | 8/1985 | Kordomenos | 523/415 |
| 4,931,157 | 6/1990 | Valko et al. | 204/181.7 |
| 4,933,056 | 6/1990 | Corrigan et al. | 204/181.7 |
| 5,074,979 | 12/1991 | Valko et al. | 204/181.7 |
| 5,096,556 | 3/1992 | Corrigan et al. | 204/181.7 |
| 5,147,906 | 9/1992 | Nishida et al. | 523/415 |
| 5,283,124 | 2/1994 | Fujibayashi et al. | 523/204 |

OTHER PUBLICATIONS

*Progress in Organic Coatings*, "Blocked Isocyanates" by Z. W. Wicks, Jr., 3 (1975) pp. 73–99.
General Motors Engineering Standards, Materials and Processes–Procedures—Chip Resistance of Coating (GM9408P), Jul. 1991, pp. 1–8.

*Primary Examiner*—Frederick Krass
*Attorney, Agent, or Firm*—Kenneth J. Stachel; Krisanne Shideler; William J. Uhl

[57] ABSTRACT

An electrodepositable composition is provided comprising: a non-gelled, cationic, water-dispersible resin, electrodepositable on a cathode, which is derived from a polyepoxide and which contains in the resin molecule cationic salt groups, beta-hydroxy ester groups, active hydrogen groups including free phenolic hydroxyl groups, and capped isocyanate groups. The composition provides excellent corrosion resistance when electrodeposited over steel substrates, and does not require lead in the formulation nor the use of a conventional chrome rinse for the steel substrate during pretreatment before electrodeposition.

22 Claims, No Drawings

CATIONIC RESIN CONTAINING CAPPED ISOCYANATE GROUPS SUITABLE FOR USE IN ELECTRODEPOSITION

BACKGROUND OF THE INVENTION

1. Field of the Invention

The present invention relates to cationic resins and to their use in electrodeposition, and particularly to cationic resins containing capped isocyanate groups and to their use in electrodeposition.

2. Brief Description of the Prior Art

The application of a coating by electrodeposition involves depositing a film-forming composition to an electrically conductive substrate under the influence of an applied electrical potential. Electrodeposition has gained prominence in the coatings industry because in comparison with non-electrophoretic coating methods, electrodeposition provides higher paint utilization, outstanding corrosion resistance, and low environmental contamination. Early attempts at commercial electrodeposition processes used anionic electrodeposition, where the workpiece being coated served as the anode. However, in 1972, cationic electrodeposition was introduced commercially. Since that time, cationic electrodeposition has become increasingly popular and today is the most prevalent method of electrodeposition. Throughout the world, more than 80 percent of all motor vehicles manufactured are given a primer coating by cationic electrodeposition.

To maximize corrosion resistance over steel substrates, cationic electrodeposition compositions are conventionally formulated with lead as either a pigment or a soluble lead salt. In addition, the steel substrate is usually pretreated before electrodeposition with a phosphate conversion coating and rinsed with a chromic acid solution (chrome rinse) after pretreatment. However, lead and chromium are believed to be very environmentally undesirable. The lead may be present in the effluent from electrodeposition processes and chromium may be present in the effluent from pretreatment processes, and these metals need to be removed and disposed of safely, which requires expensive waste treatment processes.

U.S. Pat. No. 5,074,979 discloses a cationic resin suitable for use in an electrodepositable composition which is free of lead and has excellent corrosion resistance. However, this composition does not provide optimum chip resistance. Moreover, such a system is unstable upon storage, generating carbon dioxide gas.

It would be desirable to provide an electrodepositable composition which does not require the use of lead and overcomes the limitations of the prior art.

SUMMARY OF THE INVENTION

In accordance with the present invention, an electrodepositable composition and a method of electrodeposition using the electrodepositable composition are provided. The electrodepositable composition comprises: a non-gelled cationic water-dispersible resin, electrodepositable on a cathode, which is derived from a polyepoxide and which contains in the resin molecule cationic salt groups, beta-hydroxy ester groups, active hydrogen groups selected from aliphatic hydroxyl and primary and secondary amino, phenolic hydroxyl groups, and capped isocyanate groups. The beta-hydroxy ester groups are incorporated into the resin by reacting the polyepoxide with a carboxylic acid. The phenolic hydroxyl groups are incorporated into the resin by reacting the polyepoxide with a polyhydric phenol such that there are unreacted phenolic hydroxyl groups remaining. The capped isocyanate groups are incorporated into the resin by reacting a partially capped polyisocyanate containing isocyanate groups with a portion of the active hydrogen groups.

DETAILED DESCRIPTION

The cationic resin of the present invention is non-gelled and is water-dispersible and can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The resulting polyepoxide can be further reacted with a carboxylic acid so as to incorporate beta-hydroxy ester groups therein, typically followed by reaction with a partially capped polyisocyanate to incorporate capped isocyanate groups. The reaction product may then be reacted with phenolic hydroxyl group-containing materials to yield a reaction product with free or unreacted phenolic hydroxyl groups. Finally, the reaction product can be reacted with a cationic salt group former to produce the cationic resin.

A chain extended polyepoxide is typically prepared as follows: the polyepoxide and polyhydroxyl group-containing material are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

The polyepoxide preferably has at least two 1,2-epoxy groups. In general the epoxide equivalent weight of the polyepoxide will range from 100 to about 2000, usually from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have epoxide equivalent weights ranging from about 180 to 500, preferably from about 186 to 350. Epoxy group-containing acrylic polymers can also be used, but they are not preferred.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

Beta-hydroxy ester groups may be incorporated into the resin by ring opening 1,2-epoxide groups of the polyepoxide with a material which contains at least one carboxylic acid group. The carboxylic acid functional material may be a monobasic acid such as dimethylolpropionic acid, glycolic acid, and 12-hydroxystearic acid; a polybasic acid such as a simple dibasic acid or the half ester reaction products of a polyol and the anhydride of a diacid, or a combination thereof. If a monobasic acid is used, it preferably has hydroxyl functionality associated with it. Suitable polybasic acids include succinic acid, adipic acid, citric acid, and trimellitic acid. If a polybasic acid is used, care must be taken to prevent gelation of the reaction mixture by limiting the amount of polybasic acid and/or by additionally reacting a monobasic acid. Suitable half ester reaction products include, for example, the reaction product of trimethylolpropane and succinic anhydride at a 1:1 equivalent ratio. Suitable hydroxyl group-containing carboxylic acids include dimethylolpropionic acid, malic acid, and 12-hydroxystearic acid. Dimethylolpropionic acid is preferred. The electrodepositable composition of the present invention preferably contains from 0.20 to 0.60 milliequivalents (meq) beta-hydroxy ester groups calculated as $$\begin{matrix} \text{OH} & \text{O} \\ | & \| \\ -\text{CH}-\text{CH}_2-\text{O}-\text{C}- \end{matrix}$$

per gram of resin solid, calculated theoretically prior to addition of the partially capped polyisocyanate. It is to be understood that a portion of the hydroxy groups in the beta-hydroxy ester groups can be expected statistically to react with isocyanate groups associated with the partially capped polyisocyanates.

The amount of beta-hydroxy ester groups or other functional groups present in a resin, expressed as milliequivalents of functional group per gram of resin solid (meq/g), is calculable as follows: for an amount x of resin, i.e., the main vehicle or the cationic water-dispersible resin, being prepared from an amount y of functional material having an equivalent weight z, $$\frac{\text{meq functional group}}{\text{g resin}} = 1000 \times \frac{y/z}{x} ;$$

for example, the amount of amino groups present in 1000 g of a resin prepared from 300 g of an amine having an amino equivalent weight of 500 (primary and secondary amines being considered monofunctional for the purpose of this calculation) is:

$$\frac{\text{meq amino group}}{\text{g resin}} = 1000 \times \frac{300/500}{1000} = 0.6 \text{ meq/g}.$$

The active hydrogens associated with the cationic resin include any active hydrogens which are reactive with isocyanates within the temperature range of about 93° to 204° C., preferably about 121° to 177° C. Typically, the active hydrogens are selected from the group consisting of aliphatic hydroxyl and primary and secondary amino, including mixed groups such as hydroxyl and primary amino. Preferably, the cationic resin will have an active hydrogen content of about 1.7 to 10 milliequivalents, more preferably about 2.0 to 5 milliequivalents of active hydrogen per gram of resin solids.

Capped isocyanate groups are incorporated into the resin by reacting a partially capped polyisocyanate containing free isocyanate groups with a portion of the active hydrogen groups associated with the resin. Typically these active hydrogen groups are hydroxyl groups associated with the original polyepoxide or those hydroxyl groups generated in the chain extension reaction of the polyepoxide or the beta-hydroxy ester group formation. The capped isocyanate groups are preferably incorporated into the resin after incorporation of the beta-hydroxy ester groups via reaction of the chain extended polyepoxide with the carboxylic acid.

The polyisocyanate can be an aliphatic or an aromatic polyisocyanate or a mixture of the two. Diisocyanates are preferred, although higher functionality polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Mixtures of the above polyisocyanates may also be used.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam and amines such as dibutylamine.

Typically there is sufficient polyisocyanate present in the composition of the present invention to provide about 0.1 to about 1.2 capped isocyanate groups for each active hydrogen in the resin; i.e., hydroxyl and primary and secondary amino. The electrodepositable composition of the present invention preferably contains from 0.3 to 2.9 meq capped isocyanate groups calculated as

per gram of resin solids. This calculation includes all urethane and urea linkages; i.e., those associated with capped isocyanate groups and those arising from reaction of an isocyanate group with an active hydrogen in the resin to yield the structure above.

Phenolic hydroxyl groups may be incorporated into the resin by using a stoichiometric excess of the polyhydric phenol during initial chain extension of the polyepoxide. Preferably, however, the phenolic hydroxyl groups are incorporated into the resin after incorporation of the beta-hydroxy ester groups by reacting a stoichiometric excess of polyhydric phenol with the resulting polyepoxide. Although a stoichiometric excess of phenolic hydroxy to epoxy is used, there still remains unreacted epoxy groups in the resulting resinous reaction product for subsequent reaction with the carboxylic acid and/or the cationic salt group former. It is believed that a portion of polyhydric phenol remains unreacted. Therefore, where it is mentioned that the resin contains unreacted phenolic groups, a resinous mixture comprising a resin having active hydrogen groups such as aliphatic hydroxyl and primary or secondary amino groups, beta-hydroxy ester groups, capped isocyanate groups, and cationic salt groups in admixture with a polyhydric phenol is meant to be included. The cationic resin in the electrodepositable composition of the present invention preferably contains from 0.02 to 0.33 meq unreacted phenolic hydroxyl groups calculated as

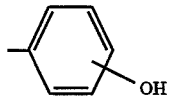

per gram of resin solids.

The resin also contains cationic salt groups. The cationic salt groups are preferably incorporated into the resin following the incorporation of the capped isocyanate groups and the phenolic hydroxyl groups. To incorporate the cationic salt groups the resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50° to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. Sulfamic acid is preferred. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably the reaction temperature is in the range of about 60° to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in the composition of the present invention. Examples of these resins and their method of preparation are described in U.S. Pat. Nos. 3,793,278 to DeBona and 3,959,106 to Bosso et al.

The extent of cationic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient cationic character that the dispersed resin particles will migrate toward and electrodeposit on a cathode when an electrical potential is set up between an anode and a cathode immersed in the aqueous dispersion.

Generally, the cationic resin in the electrodepositable composition of the present invention is non-gelled and contains from about 0.1 to 3.0, preferably from about 0.1 to 0.7 milliequivalents of cationic salt group per gram of resin solids. The number average molecular weight of the cationic resin preferably ranges from about 2,000 to about 15,000, more preferably from about 5,000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The electrodepositable composition of the present invention is used in an electrodeposition process in the form of an aqueous dispersion. By "dispersion" is meant a two-phase transparent, translucent, or opaque aqueous resinous system in which the resin, pigment, and water insoluble materials comprise the dispersed phase and water and water soluble materials comprise the continuous phase. The dispersed phase has an average particle size less than about 10 microns, preferably less than 0.5 microns. The aqueous dispersion preferably contains at least about 0.05 and usually about 0.05 to 50 percent by weight resin solids, depending on the particular end use of the dispersion.

The aqueous dispersion may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as methyl isobutyl ketone and isophorone. The coalescing solvent is usually present in an amount up to about 40 percent by weight, preferably ranging from about 0.05 to 25 percent by weight based on total weight of the aqueous medium.

The electrodepositable composition of the present invention may further contain pigments and various other optional additives such as catalysts, plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically about 1 to 20 percent by weight based on weight of resin solids.

Curing catalysts, preferably tin catalysts such as dibutyltin dilaurate and dibutyltin oxide, are usually present in the electrodepositable composition of the present invention. When present, they are used in amounts of about 0.05 to 5 percent by weight based on weight of resin solids.

Suitable pigments include, for example, iron oxides, carbon black, coal dust, titanium dioxide, talc and barium sulfate. Lead pigments may be used; however, the electrodepositable composition of the present invention provides outstanding corrosion resistance for steel substrates without the use of lead pigments. The pigment content of the aqueous dispersion, generally expressed as the pigment to resin (or binder) ratio (P/B) is usually about 0.1:1 to 1:1.

In the process of electrodeposition the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the electrodepositable composition of the present invention. Steel substrates are preferred because the composition provides significant corrosion protection to these substrates. Although it is conventional to pretreat the steel substrate with a phosphate conversion coating, usually a zinc phosphate conversion coating, followed by a chromic acid rinse, the composition of the present invention may be applied to steel substrates which have not been given a chrome rinse and still provides excellent corrosion resistance.

After deposition, the coating is heated to cure the deposited composition. The heating or curing operation is usually carried out at a temperature in the range of from 120° to 250° C., preferably from 120° to 190° C. for a period of time ranging from 10 to 60 minutes. The thickness of the resultant film is usually from about 10 to 50 microns.

The composition can be applied by means other than electrodeposition including brushing, dipping, flow coating, spraying and the like, but it is most often applied by electrodeposition.

The invention will further be described by reference to the following examples. Unless otherwise indicated, all parts are by weight.

Examples 1 to 3 illustrate the preparation of a partially capped polyisocyanate, a cationic resin, and an electrodepositable composition in accordance with the present invention. Examples 4 to 6 are comparative examples of materials made in accordance with U.S. Pat. No. 5,074,979.

EXAMPLE 1

A partially-capped polyisocyanate for use in the preparation of a cationic water dispersible resin was prepared as follows:

A 5000 ml 4-neck round bottom flask, which was equipped with a stirrer, a heating mantle, a thermocouple, a condenser topped with a drying tube, a gas inlet tube and an addition funnel, was charged with 1306.3 gm (9.904 equiv.) of a polymethylene polyphenylene polyisocyanate (PAPI 2940, available from Dow Chemical Co.) and 486.0 gm of methyl isobutyl ketone. Under a nitrogen blanket, this solution was heated to 40° C. To this was added 832.3 gm (5.138 equiv.) of 2-(2-ethoxybutoxy) ethanol over at least 2 hours with the reaction temperature about 55°–60° C. After the addition was completed, the reaction mixture was held at 65° C. for at least 2 hours. The NCO equivalent weight was determined to be 545 (theoretical=551).

EXAMPLE 2

A non-gelled cationic water-dispersible resin for use as the main vehicle in the preparation of an etectrodepositable composition was prepared as follows:

A 5000 ml 4-neck round bottom flask, which was equipped with a stirrer, a heating mantle, a condenser topped by a drying tube, a thermocouple, a gas inlet tube and an addition funnel, was charged with a mixture of 592.6 gm (3.152 equiv.) of a diglycidyl ether of Bisphenol A (EPON 828, available from Shell Oil and Chemical Co.), 133.1 gm (0.993 equiv. acid) of dimethylolpropionic acid, 114.2 gm (0.491 equiv.) of an ethoxylated Bisphenol A polyol (MACOL 98, available from PPG Industries, Inc.), and 66.7 gm of the formal of 2-(2-ethoxybutoxy) ethanol (MAZON 1651, available from PPG Industries, Inc.). Under a nitrogen blanket, this was heated to 110° C. At 110° C., 0.8 gm of ethyl triphenylphosphonium iodide was added and the temperature was increased to 125° C. The reaction was held at 125° C. until the acid number was 0.5. At that point, the epoxy equivalent weight was determined to be 468 (based on resin solids). 179.5 gm of methyl isobutyl ketone was added and the reaction mixture was cooled to 75° C., followed by the addition of 1032.2 gm (approx. 840 gm solids, 1.894 equiv.) of the partially-capped polyisocyanate of Example 1 over about 110 min. with the temperature being maintained at 75°–80° C. After the addition was completed, the reaction mixture was held at 75° C. for 30 min., at which time it was found to be free of isocyanate by infrared analysis. The epoxy equivalent weight was determined to be 870 at this point and the Gardner-Holdt reduced viscosity (60% solids with 1-methoxy-2-propanol) was T-. To the reaction mixture were then added 145.0 gm (0.623 equiv.) of MACOL 98 and 200.3 gm (1.757 equiv.) of Bisphenol A, and the temperature was raised to 100° C. At 100° C., 1.5 gm of benzyl dimethylamine catalyst was added and the temperature was adjusted to 105° C. The reaction was held at 105° C. until the epoxy equivalent weight was 1990 (based on resin solids), with a Gardner-Holdt reduced (as above) viscosity of V-, whereupon 139.6 gm (0.377 equiv. of secondary amine) of the methyl isobutyl diketimine of diethylene triamine (72% solids in methyl isobutyl ketone) and 28.3 gm (0.377 equiv.) of N-methylethanolamine were added. The temperature was adjusted to 105° C. and held for 1 hour. The Gardner-Holdt reduced (as above) viscosity was found to be W-X. A portion of this resinous reaction product, 2275 gm (1920 gm solids), was poured into a solution of 58.6 gm (0.604 equiv.) of sulfamic acid in 1263.9 gm of deionized water to form a non-gelled cationic water dispersible resin. The dispersion was thinned with an additional 1750.1 gm of deionized water, followed by additional thinning with about 900 more grams of deionized water. The dispersion was solvent stripped by heating to 60°–65° C. and exposing to reduced pressure to remove volatile organic solvents. The stripped dispersion was found to have a solids content of 32.3%.

The final product had a beta-hydroxy ester group content of 0.43 meq/g resin solids, a phenolic hydroxyl group content of about 0.16 meq/g resin solids, a capped isocyanate group content of 1.7 meq/g resin solids, and an active hydrogen group content (i.e., aliphatic hydroxyl, primary and secondary amine) of 2.4 meq/g resin solids. All were calculated values.

EXAMPLE 3

An electrodepositable composition in the form of a lead-free paint was prepared as follows:

To 1299.0 gm of the dispersion of Example 2 were added 168.1 gm (58.5 gm solids) of a flexibilizing agent made by reacting polyoxypropylene diamine of about 2000 molecular weight (JEFFAMINE D2000, available from Texaco Chemical Co.) with Bisphenol A diglycidyl ether of about 500 epoxy equivalent weight (EPON 1001, available from Shell Chemical Co.) as described in U.S. Pat. Nos. 4,420,574, 4,423,166, and 4,432,850 but neutralized with sulfamic acid as described in U.S. Pat. No. 4,933,056; 53.6 gm (9.8 gm solids) of a flow modifier as described in U.S. Pat. No. 5,096,556, 99.7 gm (9.5 gm resin solids, 52.7 gm pigment solids) of a pigment paste which contained 6.9 gm of dibutyltinoxide catalyst, 30.0 gm of titanium dioxide (R 900, available from E. I. du Pont de Nemours and Co.), 14.9 gm of aluminum silicate (available from Engelhard Corp.), and 0.85 gm of carbon black (Printex 200, available from the Degussa Corp.), but no lead. The paint was thinned with 879.6 gm of deionized water. The resulting paint was ultrafiltered, removing 20% of the total paint weight and the ultrafiltrate was replaced weight for weight with deionized water. Cold rolled steel (CRS) panels and zinc phosphate pretreated steel panels were immersed in and electrocoated with the paint at 245 volts for 2 min. at a paint temperature of 85° F. (29° C.). After rinsing with deionized water and air drying, a set of the panels was baked for 30 minutes at 320° F. (160° C.) and a set was baked for 30 minutes at 340° F. (171° C.). Both sets of panels were subjected to GM Scab Corrosion cyclic testing and compared to similar substrates coated with the electrodepositable composition of Example 6 below.

EXAMPLE 4 (COMPARATIVE)

An acid-functional crosslinker as described in U.S. Pat. No. 5,074,979 was prepared as follows:

A 5000 ml 4-neck round bottom flask, which was equipped with a stirrer, a heating mantle, a condenser topped with a drying tube, a thermocouple, a gas inlet tube and an addition funnel, was charged with 1306.3 gm (9.904 equiv.) of PAPI 2940 and 608.1 gm of methyl isobutyl ketone. Under a nitrogen blanket, this solution was heated to 40° C., whereupon addition of a total of 832.3 gm (5.138 equiv.) of 2-(2-ethoxybutoxy)ethanol was begun. The temperature was allowed to rise to about 65° C. over the course of the addition, which covered about 2 hours. After the addition was completed, the reaction mixture was held at 65° C. for at least 1 hour. The isocyanate equivalent weight was determined to be 586 (theoretical=576). To this was added 338.5 gm (5.052 equiv. of hydroxyl) of dimethylolpropionic acid and 254.4 gm of methyl isobutyl ketone. The temperature was raised to 95° C. and held there until the reaction mixture was found to be free of isocyanate by infrared analysis. At that point, an additional 198.8 gm of methyl isobutyl ketone was added. The product had an acid number of 38.43 mg KOH/gm and a 71.1% solids content.

EXAMPLE 5 (COMPARATIVE)

A cationic water-dispersible resin as described in U.S. Pat. No. 5,074,979 was prepared as follows:

A 5000 ml 4-neck round bottom flask, which was equipped with a stirrer, a heating mantle, a condenser, a thermocouple and a gas inlet tube, was charged with a mixture of 1370.2 gm (974.2 gm solids, 0.938 equiv. acid) of the acid-functional crosslinker of Example 4, 259.2 gm (1.07 equiv.) of MACOL 98, 592.6 gm (3.152 equiv.) of EPON 828, 200.3 gm (1.757 equiv.) of Bisphenol A and 66.7 gm of MAZON 1651. Under a nitrogen blanket, the mixture was heated to 95° C. At that point, 1.5 gm of benzyl dimethylamine was added and the temperature was adjusted to 105° C. An additional 1.0 gm of benzyl dimethylamine was added while holding the reaction mixture at 105° C. to attain an epoxy equivalent weight of 2185 (based on resin solids) and a Gardner-Holdt viscosity (reduced to 60% solids with 1-methoxy-2-propanol) of T-U, whereupon 140.7 gm (0.380 equiv. of secondary amine) of the methyl isobutyl diketimine of diethylene triamine (72% solids in methyl isobutyl ketone) and 28.5 gm (0.379 equiv.) of N-methyl ethanolamine were added. The temperature was adjusted to 105° C. and held there for 1 hour. Under reduced pressure, 159 gm of volatiles was removed. A portion of this resinous reaction product, 2100 gm (1869 gm solids), was poured into a solution of 57.1 gm (0.588 equiv.) of sulfamic acid in 1344.9 gm of deionized water to form a non-gelled cationic water dispersible resin. The resin was thinned with an additional 1703.6 gm of deionized water, followed by further thinning with an additional 600 gm of deionized water. The dispersion was solvent stripped by heating to 60°-65° C. and exposing to reduced pressure to remove volatile organic solvents. The stripped dispersion was found to have a 37.2% solids content. The solids were further reduced to 32.3% with 785.7 gm of deionized water.

EXAMPLE 6 (COMPARATIVE)

An electrodepositable composition in the form of a lead-free paint as described in U.S. Pat. No. 5,074,979 was prepared as follows:

To 1299.0 gm (419.6 gm solids) of the dispersion of Example 5 were added 168.1 gm (58.5 gm) of the flexibilizing agent described in Example 3, 53.6 gm (9.8 gm solids) of the flow modifier described in Example 3, and 99.7 gm (9.5 gm resin solids, 52.7 gm pigment solids) of the pigment paste described in Example 3. The paint was thinned with 879.6 gm of deionized water. The resulting paint was ultrafiltered, removing 20% of the total paint weight and the ultrafiltrate was replaced weight for weight with deionized water. Cold rolled steel (CRS) and zinc phosphate pretreated panels were immersed in and electrocoated with the paint at 200 volts for 2 min. at a paint temperature of 80° F. (27° C.) (film build was identical to the panels in Example 3). After rinsing with deionized water and air drying, a set of panels was baked for 30 minutes at 320° F. (160° C.) and a set of panels was baked for 30 minutes at 340° F. (171° C.). Both sets of panels were subjected to GM Scab Corrosion cyclic testing as in Example 3 above.

Gas Evolution Testing

The stripped dispersions of Examples 2 and 5 were compared with respect to gas evolution of the dispersions on storage. Two clean and dry 2.5 liter glass jugs were filled to within 4 cm of the top with the stripped dispersions, both at 32.3% solids, one in each jug. The jug cap in each case had been modified with a stainless steel gas-tight fitting and a stainless steel ⅛ inch o.d. tube of about 18 inches in length. The tubes were curved into an "S" shape to permit the open end to securely fit into the mouth of one of two 50 ml burettes which had been filled with mineral oil and inverted into 400 ml beakers filled with mineral oil. Both assemblies were stored side-by-side to be exposed to the same laboratory ambient conditions. Gas evolution was measured by volume of mineral oil displacement. (Previous head space gas chromatographic/mass spectral analysis revealed the evolved gas to be largely carbon dioxide.) In the course of 6 months and 20 days, the stripped dispersion of Example 5 was found to have produced a total of 51.6 ml of gas, evolved sporadically throughout the entire period (in fact, evolution did not cease at 6 months and 20 days). The stripped dispersion of Example 2, by comparison, had evolved only 4.8 ml of gas by the end of the same period, and that amount had not increased after the first 15 days.

Scab Corrosion Cyclic Testing

The lead-free paints of Examples 3 and 6 were compared with respect to a modification of the General Motors Scab Corrosion Cyclic Testing Method TM54-26.

Electrocoated panels were scribed with an "X" and held in an oven at 60° C. for 1 hour. The panels were then held at −25° C. for 30 minutes. The panels were then immersed into a 5% sodium chloride solution at room temperature. Immersion was for 15 minutes, after which the panels were removed from the solution and left at ambient conditions for 1 hour 15 minutes. The panels were placed in a humidity chamber at 85% relative humidity and 60° C. for 22.5 hours.

Panels which were untreated CRS went through a total of 20 salt solution/humidity cycles with high and low temperature holds after every seventh cycle, while panels which were zinc phosphated underwent a total of 25 salt solution/humidity cycles with high and low temperature holds after every seventh cycle. After testing, panels were wiped dry and left at ambient conditions for 30 minutes. A strip of 3M Scotch Brand 898 tape was firmly applied to the panels over the scribe and then quickly removed. Panels were observed for peeling of the coatings ("creep", measured in millimeters) at the scribe mark. The coated panels were rated on a scale of 1 (worst) to 10 (best) on the basis of visual comparison to standards. The results are reported in Table I below.

TABLE I

| CONDITIONS: | EXAMPLE 3 | EXAMPLE 6 (Comparative) |
|---|---|---|
| Untreated CRS, 20 CYCLES | | |
| 320° F. (160° C.)/30 min. cure | 1 [2][1] | 1 [2] |
| 340° F. (171° C.)/30 min. cure | 1 [1+] | 1 [1+] |
| BONDERITE 952[2], 25 CYCLES | | |
| 320° F. (160° C.)/30 min. cure | 4 [2] | 4 [2] |
| 340° F. (171° C.)/30 min. cure | 3 [3] | 2 [3] |
| CHEMFOS 168[3], 25 CYCLES | | |
| 320° F. (160° C.)/30 min. cure | 4 [3] | 3+ [3] |
| 340° F. (171° C.)/30 min. cure | 3 [3] | 4 [3] |

[1]The number in brackets is the rating for an analogous control panel electrocoated with a leaded paint available from PPG Industries, Inc., as PPG ED5000. The control panel accompanied the corresponding test panel throughout the cyclic testing.
[2]Panels pretreated with a zinc phosphating treatment, deionized water rinse only; no chrome rinse.
[3]Panels available from PPG Industries, Inc., Chemfil Division, pretreated with a zinc phosphating treatment, deionized water rinse only; no chrome rinse.

In almost all cases the electrodepositable composition of Example 3 was equal or superior to that of Example 6 with respect to corrosion protection.

Chip Testing

The lead-free paints of Examples 3 and 6 were also compared with respect to the General Motors Chip Test, described below. Panels coated with the paints of Example 3 and Example 6 were cured separately at three temperatures and subsequently coated with a white, solvent borne, melamine-cured base coat available from PPG Industries, Inc., as PPG NHU-90394 and a clear, solvent borne, melamine-cured top coat available from PPG Industries, Inc., as PPG DCT-3000. The coated panels were then baked to cure the top coats and subjected to the Chip Test, wherein coated and cured panels are stored at −25° C. for at least 4 hours, and at the low temperature, impacted with about 550 ml of gravel fed from a Gravelometer (available from The Q-Panel Co.). The panels are allowed to return to room temperature, are wiped dry of condensate with a cloth, and any loose chips of paint are removed with a strip of masking tape.

The coated panels were rated on a scale of 1 (worst) to 10 (best) on the basis of visual comparison to standards. The tests were run in duplicate and the results are reported in Table II below.

TABLE II

| CONDITIONS: | EXAMPLE 3 | EXAMPLE 6 (Comparative) |
|---|---|---|
| 320° F. (160° C.) | 5 to 6 | 4 to 5 |
|  | 5 to 6 | 4 to 5 |
| 340° F. (171° C.) | 6 | 4 to 5 |
|  | 5 to 6 | 5 |
| 400° F. (204.5° C.) | 4 to 5 | 4 |
|  | 5 | 4 |

The electrodepositable composition of Example 3 was consistently superior to that of Example 6 with respect to chip resistance regardless of cure temperature.

We claim:

1. An electrodepositable composition comprising a non-gelled cationic water-dispersible resin electrodepositable on a cathode which is derived from a polyepoxide and which contains in the resin molecule;

from about 0.1 to 3.0 milliequivalents of cationic salt groups, from 0.20 to 0.60 milliequivalents of beta-hydroxy ester groups calculated as

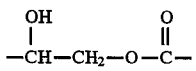

where the beta-hydroxy ester groups are incorporated into the resin by reacting the polyepoxide with a carboxylic acid;

from 1.7 to 10 milliequivalents of active hydrogen groups selected from the group consisting of aliphatic hydroxyl groups and primary and secondary amines calculated as aliphatic hydroxyl, primary amine and/or secondary amine, including mixtures thereof, phenolic hydroxyl groups where the phenolic hydroxyl groups are incorporated into the resin by reacting the polyepoxide with a polyhydric phenol such that there are unreacted phenolic hydroxyl groups remaining in an amount from 0.02 to 0.33 milliequivalents calculated as

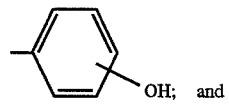

from 0.3 to 2.9 milliequivalents of capped isocyanate groups calculated as

where the capped isocyanate groups are incorporated into the resin by reacting a partially capped isocyanate containing free isocyanate groups with a portion of the active hydrogen groups;

where all of the milliequivalents are on a per gram of resin solids basis; and wherein the composition is free of lead.

2. The electrodepositable composition of claim 1 in which the polyepoxide is a polyglycidyl ether of a polyhydric alcohol.

3. The electrodepositable composition of claim 1 in which the carboxylic acid is a hydroxyl group-containing carboxylic acid.

4. The electrodepositable composition of claim 3 in which the hydroxyl group-containing carboxylic acid is dimethylolpropionic acid.

5. The electrodepositable composition of claim 1 in which the polyhydric phenol is Bisphenol A.

6. The electrodepositable composition of claim 1 in which the partially capped isocyanate is selected from the group consisting of partially capped 2,4- and 2,6-toluene diisocyanate including mixtures thereof; partially capped diphenylmethane-4,4'-diisocyanate and mixtures of partially capped diphenylmethane-4,4'-diisocyanate and partially capped polymethylene polyphenyl isocyanate.

7. The electrodepositable composition of claim 1 in which the cationic salt groups are amine salt groups.

8. The electrodepositable composition of claim 1 in which the active hydrogens other than the phenolic hydroxyl are selected from the group consisting of primary amine groups, aliphatic hydroxyl groups and mixtures thereof.

9. A method of electrocoating an electroconductive substrate which serves as a cathode in an electrical circuit comprising said cathode and an anode immersed in an aqueous electrodepositable composition containing a cationic water dispersible resin, said method comprising passing an electric current between the anode and the cathode to cause the electrodepositable composition to deposit on the cathode as a substantially continuous film, and heating the electrodeposited film at an elevated temperature to cure the film, wherein the electrodepositable composition comprises a non-gelled, cationic, water-dispersible resin which is electrodepositable on a cathode, and which is derived from a polyepoxide and which contains in the resin molecule;

from about 0.1 to 3.0 milliequivalents of cationic salt groups;

from 0.20 to 0.60 milliequivalents of beta-hydroxy ester groups calculated as

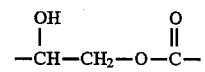

incorporated into the resin by reacting the polyepoxide with a carboxylic acid;

from 1.7 to 10 milliequivalents of active hydrogen groups selected from the group consisting of aliphatic hydroxyl groups and primary and secondary amines, including mixtures thereof, calculated as aliphatic hydroxyl, primary amine and/or secondary amine;

phenolic hydroxyl groups incorporated into the resin by reacting the polyepoxide with a polyhydric phenol such that there are unreacted phenolic hydroxyl groups remaining in an amount from 0.02 to 0.33 milliequivalents calculated as

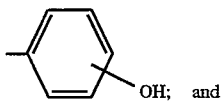

from 0.3 to 2.9 milliequivalents of capped isocyanate groups calculated as

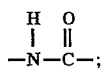

incorporated into the resin by reacting a partially capped polyisocyanate containing free isocyanate groups with a portion of the active hydrogen groups;

where all of the milliequivalents are on a per gram of resin solids basis;

and wherein the composition is free of lead.

10. The method of claim 9 wherein the cathode is a steel substrate which has not been given a chrome rinse pretreatment.

11. The method of claim 9 in which the polyepoxide is a polyglycidyl ether of a polyhydric alcohol.

12. The method of claim 9 in which the carboxylic acid is a hydroxyl group-containing carboxylic acid.

13. The method of claim 12 in which the hydroxyl group-containing carboxylic acid is dimethylolpropionic acid.

14. The method of claim 9 in which the polyhydric phenol is Bisphenol A.

15. The method of claim 9 in which the partially capped isocyanate is selected from the group consisting of partially capped 2,4- and 2,6-toluene diisocyanate including mixtures thereof; partially capped diphenylmethane-4,4'-diisocyanate and mixtures of partially capped diphenylmethane-4,4'-diisocyanate and partially capped polymethylene polyphenyl isocyanate.

16. The method of claim 9 in which the cationic salt groups are amine salt groups.

17. The method of claim 9 in which the active hydrogens other than the phenolic hydroxyl are selected from the group consisting of primary amine groups, aliphatic hydroxyl groups and mixtures thereof.

18. The method of claim 9 wherein the electrodepositable composition is free of lead.

19. The electrodepositable composition of claim 1, wherein the polyepoxide is chain extended by reaction with polyhydroxyl group-containing material selected from alcoholic hydroxyl group-containing materials and phenolic hydroxyl group-containing materials to build the molecular weight of the polyepoxide.

20. The electrodepositable composition of claim 1, wherein the carboxylic acid reacted with the polyepoxide to incorporate beta-hydroxy ester groups is a monobasic acid.

21. An electrodepositable composition comprising a non-gelled cationic water-dispersible resin electrodepositable on a cathode which is derived from a polyepoxide and which contains in the resin molecule; cationic salt groups; 0.20 to 0.60 milliequivalents on a per gram basis of resin solids of beta-hydroxy ester groups calculated as

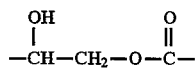

incorporated into the non-gelled resin by reacting the polyepoxide with a hydroxyl group-containing carboxylic acid; active hydrogen groups selected from the group consisting of aliphatic hydroxyl groups and primary and secondary amines, including mixtures thereof; phenolic hydroxyl groups; and capped isocyanate groups; the phenolic hydroxyl groups being incorporated into the resin by reacting the polyepoxide with a polyhydric phenol such that there are unreacted phenolic hydroxyl groups remaining; and the capped isocyanate groups being incorporated into the resin by reacting a partially capped isocyanate containing free isocyanate groups with a portion of the active hydrogen groups.

22. The electrodepositable composition of claim 21 in which the hydroxyl group-containing carboxylic acid is dimethylolpropionic acid.

* * * * *

UNITED STATES PATENT AND TRADEMARK OFFICE
CERTIFICATE OF CORRECTION

PATENT NO.  : 5,633,297
DATED       : May 27, 1997
INVENTOR(S) : Joseph T. Valko and Richard F. Karabin It is certified that error appears in the above-indentified patent and that said Letters Patent is hereby corrected as shown below:

Claim 1, column 13, line 43, replace ";" with --:-- after the word "molecule";
Claim 9, column 14, line 56, replace ";" with --:-- after the word "molecule";
Claim 21, column 16, line 22, replace ";" with --:-- after the word "molecule".

Signed and Sealed this

Fourteenth Day of October, 1997

Attest:

BRUCE LEHMAN

Attesting Officer

Commissioner of Patents and Trademarks